(12) United States Patent
Wong (10) Patent No.: US 8,478,772 B2
(45) Date of Patent: Jul. 2, 2013

(54) ON-DEVICE DATABASE SERVICE FOR MOBILE DEVICE

(75) Inventor: Hinkmond Wong, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 155 days.

(21) Appl. No.: 12/909,056

(22) Filed: Oct. 21, 2010

(65) Prior Publication Data

US 2012/0101993 A1 Apr. 26, 2012

(51) Int. Cl.
*G06F 7/00* (2006.01)
*G06F 17/30* (2006.01)

(52) U.S. Cl.
USPC ............................................ 707/760

(58) Field of Classification Search
USPC ............................................ 707/760
See application file for complete search history.

(56) References Cited

U.S. PATENT DOCUMENTS

| | | | | |
|---|---|---|---|---|
| 5,696,961 | A * | 12/1997 | Briscoe et al. | 707/769 |
| 2002/0029214 | A1* | 3/2002 | Yianilos et al. | 707/7 |
| 2002/0052968 | A1* | 5/2002 | Bonefas et al. | 709/231 |
| 2002/0078072 | A1* | 6/2002 | Tan et al. | 707/201 |
| 2005/0216421 | A1* | 9/2005 | Barry et al. | 705/64 |
| 2007/0088705 | A1* | 4/2007 | Chen et al. | 707/10 |
| 2007/0236606 | A1* | 10/2007 | Reerslev et al. | 348/562 |
| 2008/0235662 | A1* | 9/2008 | Chen et al. | 717/118 |
| 2009/0228509 | A1 | 9/2009 | McCarthy et al. | |
| 2009/0313621 | A1* | 12/2009 | Dewa | 718/1 |

OTHER PUBLICATIONS

Android Developers: "Applications Fundamentals", pp. 1-19, http://developer.android.com/guide/topics/fundamentals.html.
Oracle Corporation, Oracle Berkeley DB datasheet, pp. 1-2, http://www.oracle.com/technetwork/database/berkeleydb/berkeley-db-datasheet-132390.pdf.
Quasay H. Mahmoud, "Getting Started with Data Synchronization Using SyncML," Sep. 2004, pp. 1-7, http://developers.sun.com/mobility/midp/articles/syncml/.
MobiiForms, "The Mobiforms Sync Server Architecture," pp. 1-2, http://www.aspnet.plus.com/mobiforms/mobile_sync_server.htm.
Oracle Corporation, "Oracle Database Lite: Synchronizing Data Between a Device and an Oracle Database," Oracle White Paper, Aug. 2007, pp. 1-19, http://www.oracle.com/technetwork/database/database-lite/olsync-131762.pdf.
SQLite, "About SQLite,", pp. 1-2, http://www.sqlite.org/about.html.
IBM, "Build a Smart J2ME mobile application, Part 1," Apr. 5, 2005, pp. 1-20, http://www.ibm.com/developerworks/java/tutorials/wi-smart/wi-smart-pdf.pdf.
IBM, "Build a Smart J2ME mobile application, Part 1," May 24, 2005, pp. 1-24, http://www.ibm.com/developerworks/java/tutorials/wi-smart2/wi-smart2-pdf.pdf.

* cited by examiner

*Primary Examiner* — Charles Lu
(74) *Attorney, Agent, or Firm* — Miles & Stockbridge P.C.

(57) ABSTRACT

A database system of a mobile device that includes an on-device database service is provided. The on-device database service accepts a connection request from an application, and receives a database command from the application. The on-device database service translates the database command into a structured query language command, and transmits the structured query language command to an embedded database. After a database operation is performed by the embedded database, the on-device database service receives a result of the structured query language command that is transmitted from the embedded database, and the on-device database service transmits the result to the application.

19 Claims, 7 Drawing Sheets

ON-DEVICE DATABASE SERVICE FOR MOBILE DEVICE

FIELD

One embodiment is directed to a mobile device, and more particularly, to a database system for a mobile device.

BACKGROUND

An embedded database system is a database management system that is integrated with a software application, or "application," that requires access to stored data, such that the database system is "hidden" from the software application's end-user. Embedded databases that can handle structured query language ("SQL") commands are typically single-threaded and single-processing. Implementations of embedded databases generally consist of one of the following interfaces: a linked static or dynamic native database library; one or more C or C++ native function calls; or a single application connection to a native database library.

These typical implementations suffer from the following drawbacks. First, in general, only one application can communicate with an embedded database at a given time. In the implementation, the embedded database cannot communicate with other applications while concurrently communicating with the first application. This is because only one application can modify the data stored in the embedded database at a time, in order to protect the integrity of data in the embedded database. Thus, when two or more applications are in contention to access the embedded database, one application generally blocks the other applications from accessing the embedded database.

Second, in order to communicate with the embedded database, an application, in general, is either required to know what type of database the embedded database is, or is required to communicate with an intermediary application (generally written in the C or C++ programming language), where the intermediary application is required to know what type of database the embedded database is. Thus, either the application, or its corresponding intermediary application, must include database functions that can communicate with a native database library of the embedded database.

Third, typical implementations involve loading a database library of the embedded database into either the application connecting to the embedded database or the intermediary application used to communicate with the embedded database. This leads to higher memory requirements when multiple applications are executing concurrently, as each application, or its corresponding intermediary application, is required to load the database library of the embedded application into memory.

SUMMARY

One embodiment is directed to a computer-readable medium having instructions stored thereon that, when executed by a processor, cause the processor to process database commands using an on-device database service executed on a mobile device. The instructions include listening for a connection request to a on-device database service executed on a mobile device from an application using a socket, where the on-device database service includes a service that is executed in a background of the mobile device, and accepting the connection request from the application using the socket. The instructions further include receiving a database command from the application using the socket, and translating the database command into a structured query language command. The instructions further include transmitting the structured query language command to an embedded database, and receiving a result of the structured query language command that is transmitted from the embedded database. The instructions further include transmitting the result to the application using the socket.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is directed to a database system of a mobile device that includes an on-device database service. The on-device database service is initiated and is executed in a background of the mobile device. The on-device database service receives a connection from an application, and processes platform-independent database commands for an embedded database of the mobile device. In certain embodiments, the on-device database service can support concurrent connections from multiple applications, allowing multiple applications to access and update the embedded database at the same time. Ultimately, the embedded database can be synchronized with an enterprise database that resides on a centralized server using a mobile sync server.

Figure 1:
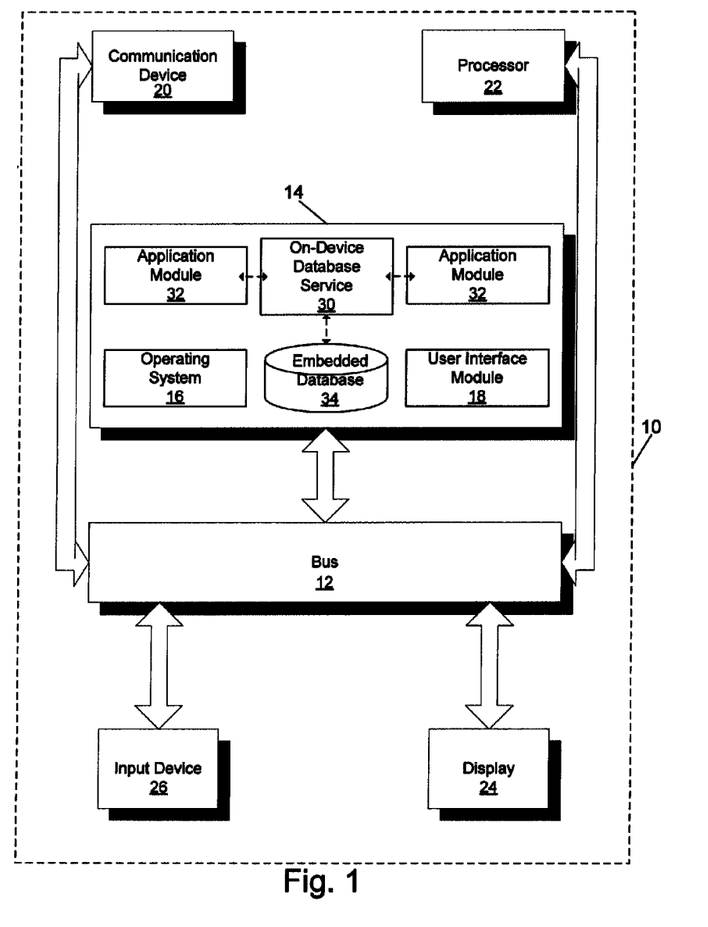
FIG. 1 illustrates a block diagram of a mobile computing device that may implement an embodiment of the present invention.
Figure 2:
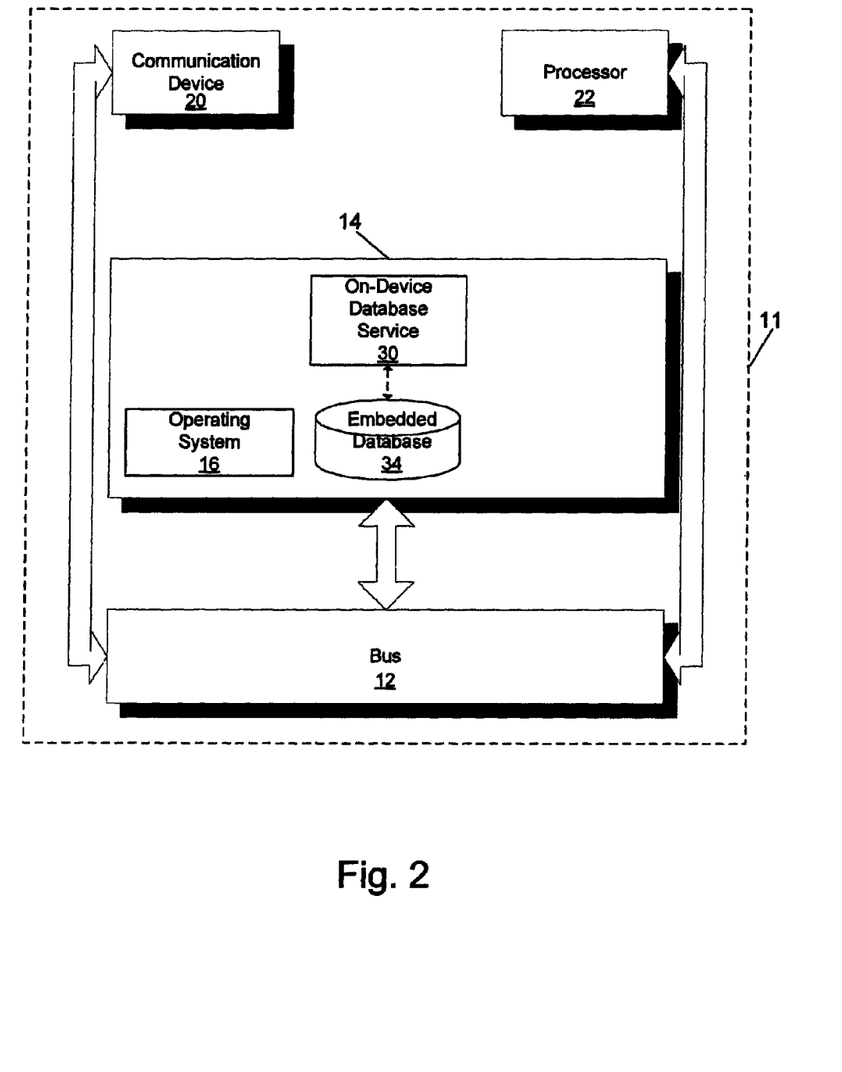
FIG. 2 illustrates a block diagram of a mobile communication device that may also implement an embodiment of the present invention.

In this specification, the term "mobile device" includes a mobile computing device and a mobile communication device. FIGS. 1-2 describe a mobile computing device and a mobile communication device, respectively, in greater detail in accordance with embodiments.

FIG. 1 illustrates a block diagram of a mobile computing device 10 that may implement one embodiment of the invention. As appreciated by one of ordinary skill in the relevant art, a mobile computing device is a compact computing device. According to the embodiment, mobile computing device 10 can be a mobile computer, a mobile phone, a smartphone (such as an iPhone, Blackberry, and smartphone executing an Android operating system), a personal digital assistant ("PDA"), a calculator, a handheld game console, a portable media player, a digital still camera, a digital video camera, a pager, a personal navigation device, or another similar type of mobile computing device. Mobile computing device 10 includes a bus 12 or other communications mechanism for communicating information between components of mobile computing device 10. Mobile computing device 10 also includes a processor 22, operatively coupled to bus 12, for processing information and executing instructions or operations. Processor 22 may be any type of general or specific purpose processor. Mobile computing device 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Mobile computing device 10 further includes a communication device 20, such as a transceiver or other communications interface, to provide access to a network. As a result, a user may interface with mobile computing device 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. An input device 26, such as a key pad, keyboard, and touch screen, can also be operatively coupled to bus 12 to enable the user to interface with mobile computing device 10.

According to one embodiment, memory 14 can store software modules that can provide functionality when executed by processor 22. The modules can include an operating system 16 and a user interface module 18. Operating system 16 can provide an operating system functionality for mobile computing device 10. User interface module 18 can provide functionality allowing a user to interact with mobile computing device 10.

The modules stored on memory 14 can also include an on-device database service 30, application modules 32 and an embedded database 34. An on-device service is defined as a software process that is executed in a background of a mobile device, such as mobile computing device 10. A software process that is executed "in a background" of a mobile device is a software process that is executed independently rather under the direct control of a user of the mobile device, and does not require any interaction with the user. An on-device database service is defined as an on-device service with a specific purpose of allowing applications to communicate with an embedded database, such as embedded database 34. Thus, according to an embodiment, on-device database service 30 is a software process that can be initiated by processor 22 using bus 12. According to the embodiment, when on-device database service 30 is initiated, on-device database service 30 can be executed by processor 22 in the background of mobile computing device 10. This means that on-device database service 30 can be executed for any duration of time, and does not require user interaction. One of ordinary skill in the art would readily appreciate that on-device database service 30 can be referred to as a "service" or a "daemon," and that both terms can be used interchangeably. On-device database service 30 can process commands that are transmitted by application modules 32, execute corresponding commands accordingly, and transmit results of the commands back to application modules 32. On-device database service 30 can provide functionality for processing database commands, as will be described in more detail below.

Applications modules 32 are software applications that can be executed by processor 22, via bus 12, and provide specific functionality to mobile computing device 10. The software applications are also identified as mobile applications, or applications. According to an embodiment, application modules 32 can be Java Micro Edition ("ME") applications. In one embodiment, application modules 32 can includes MIDLET modules. A MIDlet is a software application, configured to execute on a mobile device, such as mobile computing device 10, that uses a Mobile Information Device Profile ("MIDP") of a Connected Limited Device Configuration ("CLDC") for the Java ME platform. In another embodiment, application modules 32 can include Xlet modules. An Xlet is a Java applet, configured to execute on a mobile device, such as mobile computing device 10, that is part of the Java TV specification of Sun Microsystems Incorporated, a subsidiary of Oracle Corporation. The Xlet uses a Personal Basis Profile ("PBP") of a Connected Device Configuration ("CDC") for the Java ME platform. As one of ordinary skill in the art would readily appreciate, a Java applet is a software application that is generally smaller than a full-feature software application, and is configured to perform a specific task, or multiple tasks, as opposed to a full set of tasks performed by a full-feature software application. A Java applet is generally delivered in a form of Java bytecode. In another embodiment, application modules 32 can include Java ME main applications. A Java ME main application, or "main application," is any Java ME application that is not an applet or an Xlet. As one of ordinary skill in the art would appreciate, a main application is not constrained by the limitations and restrictions (particularly concerning a defined lifecycle or security) that constrain applets and Xlets. Thus, main applications are less limited in starting, pausing, and stopping during their execution, and have more available system functionality when executed.

While in the illustrated embodiment of FIG. 1, mobile computing device 10 includes two application modules, one of ordinary skill in the art would appreciate that this is an example embodiment, and that mobile computing device 10 can include any number of application modules.

Embedded database 34 is a database configured to link directly with a software process that connects to embedded database 34, such as on-device database service 30. Embedded database 34 can execute in a same address space of memory 14 as the software process that connects to embedded database 34, such as on-device database service 30. As a result, no inter-process communication, either over a network, or between software processes on mobile computing device 10, is required for database operations. According to an embodiment, embedded database 34 includes a database library and one or more database files. A database library is a set of database subroutines configured to perform database operations. The database library can be in any programming language. Examples of programming languages of the database library include C, C++, Java, Perl, Tcl, Python, and PHP. The database library is also configured to perform low-level operations, such as locking, transaction logging, shared buffer management, memory management, and similar operations. The database library is also configured to be executed under any type of operating system, such as UNIX, Linux, Windows, and Mac OS X. Each database file of the one or more database files is a computer file configured to store data of embedded database 34 in an integrated collection of logically-related records. Each database file of the one or more database files can be accessed by the database library of embedded database 34. According to an embodiment, on-device database service 30 can communicate with embedded database 34 using a bridge. The bridge can process SQL commands from on-device database service 30 by converting a string of text transmitted by on-device database service 30 into a format recognized by embedded database 34.

In one embodiment, embedded database 34 is a Berkeley DB database, a product of Oracle Corporation. However, one of ordinary skill in the art would readily appreciate that this is only an example of an embedded database and that, in alternate embodiments, embedded database 34 can be any lightweight database that can be executed on a mobile device, such as mobile computing device 10. As defined in this specification, a lightweight database is a database that is sufficiently compact so that the database can be executed on a mobile device, such as mobile computing device 10. Examples of lightweight databases include Advantage Database Server, EffiProz, ElevateDB, Embedded InnoDB, Empress Embedded Database, Extensible Storage Engine, eXtremeDB, Firebird Embedded, HSQLDB, Informix Dynamic Server, InfinityDB, InterBase, ITTIA DB, NexusDB, Raima Database Manager, ScimoreDB, SolidDB, SQLite, SQL Server Compact, Valentina DB, and VistaDB.

FIG. 2 illustrates a block diagram of a mobile communication device 11 that may also implement one embodiment of the invention. In accordance with the embodiment, mobile communication device 11 is a communication device that is configured to communicate with another mobile device, such as mobile computing device 10. According to the embodiment, mobile communication device 11 can be a gateway, a router, a hub, a digital video recorder, a set-top box, an automobile entertainment system, an automobile navigation system, a game console, a residential gateway, a refrigerator, a washing machine, a factory automation device, an assembly line device, a factory floor monitoring device, or another similar type of mobile communication device.

According to the embodiment, mobile communication device 11 is similar to mobile computing device 10, but does not include certain components that are present in mobile computing device 10. Specifically, mobile communication device 11 does not include user interface module 18, display 24, input device 26, and application modules 32. Instead, according to the embodiment, mobile communication device 11 includes bus 12, memory 14, operating system 16, communication device 20, processor 22, on-device database service 30 and embedded database 34. The functionality of these components is similar to the functionality of their respective components illustrated in FIG. 1, previously described above, and thus, are not described in relation to FIG. 2.

Figure 3:
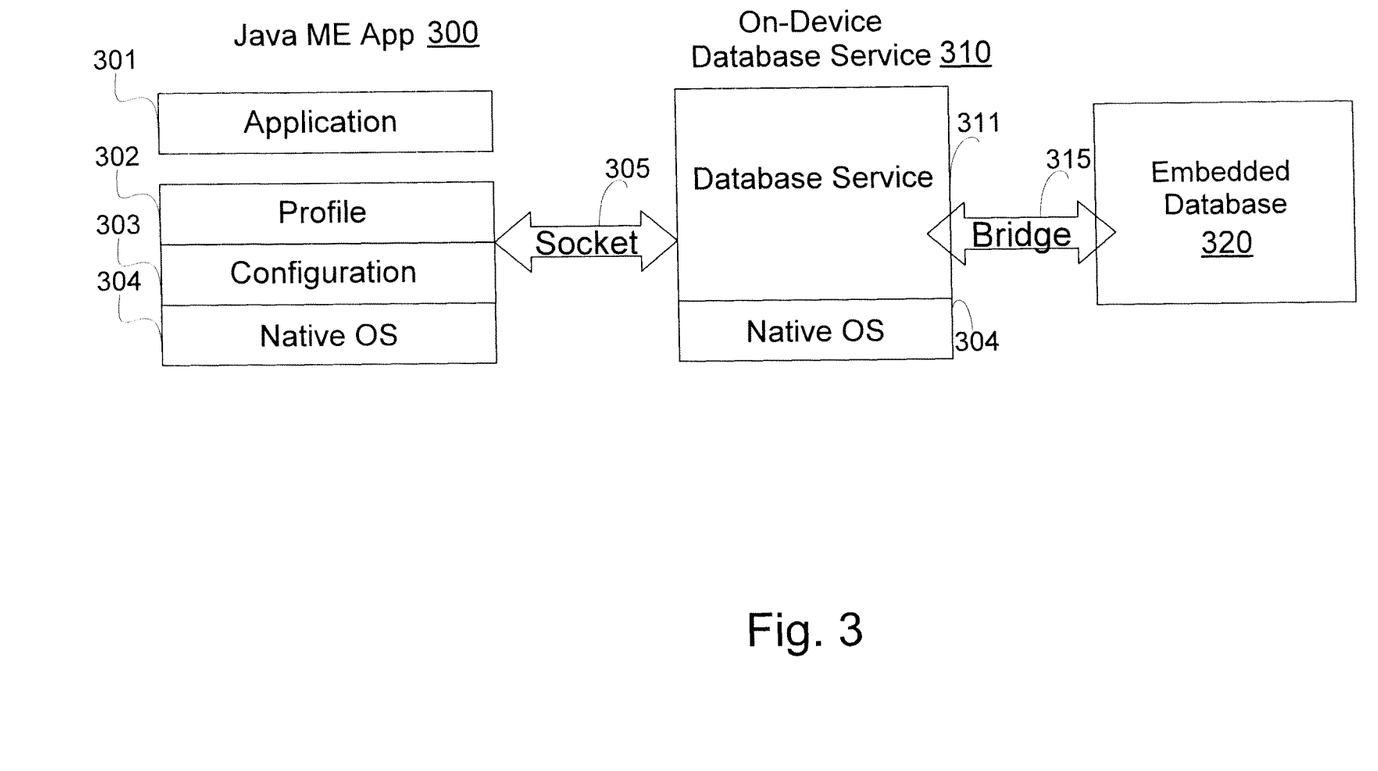
FIG. 3 illustrates a block diagram of an application communicating with an on-device database service, where the application is located on the same mobile device as the on-device database service, according to an embodiment of the invention.
Figure 4:
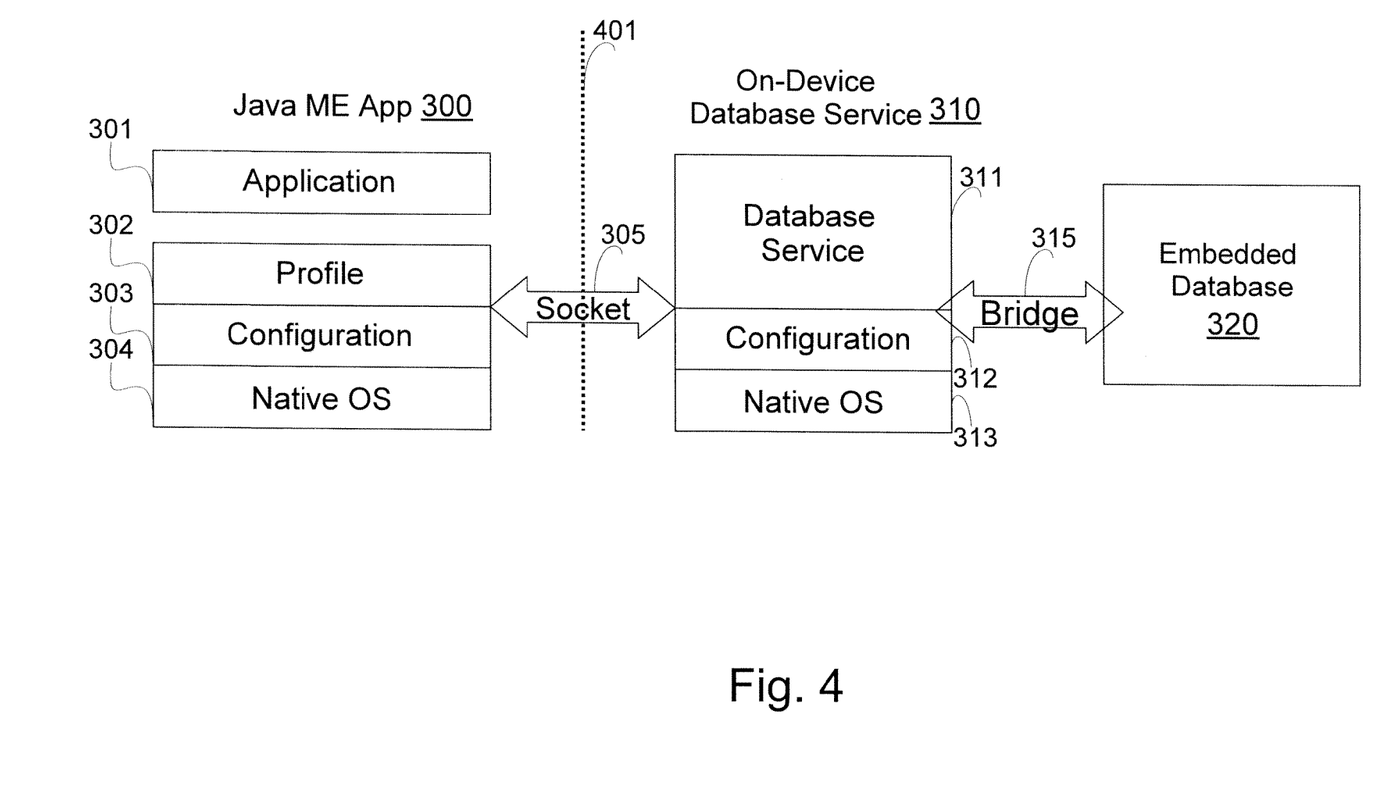
FIG. 4 illustrates a block diagram of an application communicating with an on-device database service, where the application is located on a separate mobile device from the on-device database service, according to an embodiment of the invention.
Figure 5:
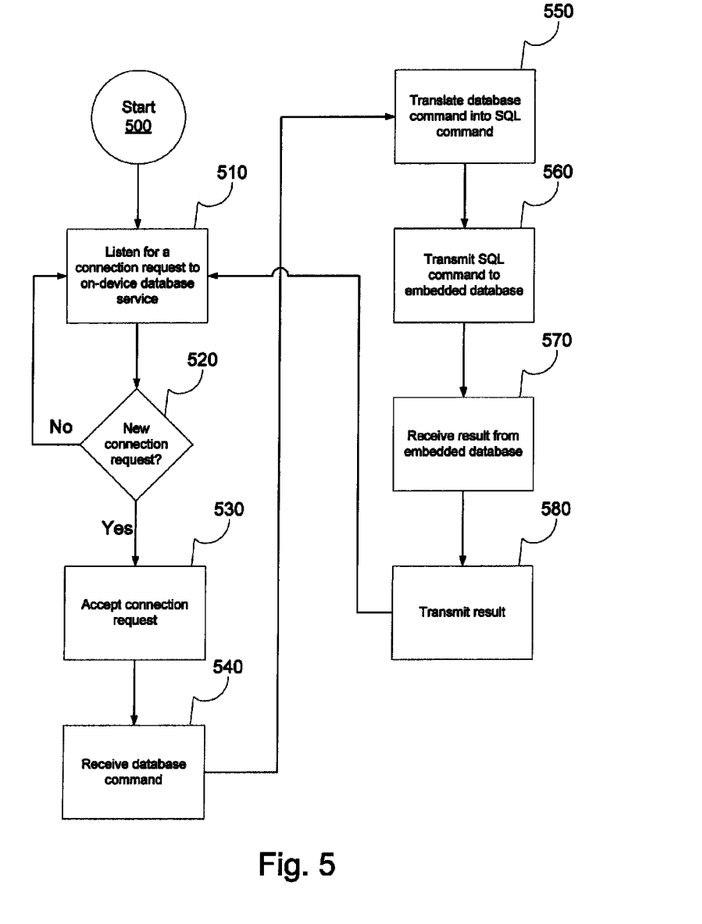
FIG. 5 illustrates a flow diagram of the functionality of an on-device database service according to an embodiment of the invention.

FIGS. 3-5 each describe a communication between an application and an embedded database, coordinated by an on-device database service, in greater detail in accordance with embodiments.

FIG. 3 illustrates a block diagram of an application communicating with an on-device database service, where the application is located on the same mobile device as the on-device database service, according to an embodiment of the invention. The illustrated embodiment includes a Java Micro Edition ("ME") application 300, an on-device database service 310, and an embedded database 320. According to the embodiment, Java ME application 300, on-device database service 310, and embedded database 320 all reside on a single mobile device (not shown).

Java ME application 300 is a software application that includes program modules written for the Java ME platform, and is an example of an application that can execute on a mobile device according to the embodiment. Java ME application 300 can provide a wide range of functionality, including, but not limited to, providing an Internet browser to a user of the mobile device, displaying text and graphics to the user, playing audio media for the user, displaying visual media to the user, and communicating with another mobile device. One of ordinary skill in the art would readily appreciate that, in alternate embodiments, a software application, represented by Java ME application 300 in FIG. 3, can include program modules written for other mobile platforms. Such other mobile platforms include the Symbian platform, the Android platform, the .NET Compact Framework, the Qt framework, the BREW platform, the Windows Mobile platform, the Palm OS platform, the Flash Lite platform, and any mobile browser.

Java ME application 300 includes application 301, profile 302, configuration 303, and native operating system ("OS") 304. Application 301 includes one or more program modules that provide the high-level functionality of Java ME application 300, and can be customized based on the high-level functionality of Java ME application 300. In one embodiment, application 301 is a main application. In another embodiment, application 301 is a MIDlet. As previously described, a MIDlet is a software application, configured to execute on a mobile device, that includes program modules, where the program modules include source code written for the Java ME platform. The MIDlet is further configured to use a MIDP of a CLDC, which is described below in greater detail. According to the embodiment, the MIDlet can be managed by special-purpose application-management software ("AMS") built into the mobile device. A MIDlet can be created by the AMS, typically, in response to a request by a user of the mobile device. A MIDlet has three possible states: paused, active, and destroyed. When a MIDlet is in a paused state, an instance of a MIDlet is constructed, and the instance of the MIDlet is inactive. When the MIDlet is in an active state, the MIDlet is active. When the MIDlet is in a destroyed state, the MIDlet is terminated, and is ready for reclamation by a garbage collector.

Below is example psuedo code of a MIDlet. One of ordinary skill in the art would appreciate that this is merely an example of a MIDlet:

```
import javax.microedition.lcdui.*;
import javax.microedition.midlet.*;
public class MIDletExample extends MIDlet {
    private Display display;
    public MIDletExample( ){
    }
    protected void destroyApp( boolean unconditional )
            throws MIDletStateChangeException {
        exitApp( ); // call cleanup code
    }
```

-continued

```
    protected void pauseApp( ){
        // add pause code here
    }
    protected void startApp( )
                throws MIDletStateChangeException {
        if( display == null ){
            initApp( ); // perform one-time initialization
        }
        // add per-activation code here
    }
    private void initApp( ){
        display = Display.getDisplay( this );
        // add initialization code here
    }
    public void exitApp( ){
        // add cleanup code here
        notifyDestroyed( ); // destroys MIDlet
    }
```

In an alternate embodiment, application 301 is an Xlet. As previously described, an Xlet is a Java applet, configured to execute on a mobile device, that is part of the Java TV specification, and uses a Personal Basis Profile ("PBP") of a Connected Device Configuration ("CDC") for the Java ME platform. Like a MIDlet, an Xlet can be managed by AMS built into the mobile device. An Xlet has four possible states: loaded, paused, active, and destroyed. When an Xlet is in a loaded state, an instance of the Xlet has been constructed but not initialized. When the Xlet is in a paused state, the Xlet has been initialized, but is inactive. When the Xlet is in an active state, the Xlet is active. When the Xlet is in a destroyed state, the Xlet has been terminated and is ready for garbage collection.

Below is example psuedo code of an Xlet. One of ordinary skill in the art would appreciate that this is merely an example of a Xlet:

```
import javax.microedition.xlet.*;
public class XletExample implements Xlet {
    private XletContext context;
    public XletExample( ){
    }
    public void destroyXlet( boolean unconditional )
            throws XletStateChangeException {
        exitXlet( ); // call cleanup code
    }
    public void exitXlet( ){
        // add cleanup code here
        context.notifyDestroyed( ); // destroys Xlet
    }
    public XletContext getContext( ){ // for convenience
        return context;
    }
    public void initXlet( XletContext context )
            throws XletStateChangeException {
        this.context = context; // store the context
        // add initialization code here
    }
    public void pauseXlet( ){
        // add pause code here
    }
    public void startXlet( ) throws XletStateChangeException {
        // add per-activation code here
    }
}
```

Profile 302 includes one or more application programming interfaces ("APIs") that support a category of mobile devices within a framework of a chosen configuration. When combined with configuration 303, profile 302 provides core application functionality for software applications that are executed on a mobile device. In an embodiment, profile 302 is an MIDP. An MIDP is a set of one or more APIs that provide functionality for applications executed on a mobile device, such as user interface functionality, network security functionality, multimedia and game functionality over-the-air provisioning functionality, and end-to-end security functionality. When combined with a CLDC, an MIDP can provide core functionality, in the form of a standard runtime environment and one or more APIs for the mobile device.

In an alternate embodiment, profile 302 is a PBP. A PBP is a set of one or more APIs that support resource-constrained devices, such as mobile devices, with a graphical user interface framework. A PBP also includes one or more APIs of a Foundation Profile, which provides additional support for applications. A PBP also provides support for an Xlet application programming module. When combined with a CDC, a PBP provides a complete application environment for applications and embedded devices.

Configuration 303 includes one or more basic APIs and virtual machine features that comprise a runtime environment for a mobile application. When combined with profile 303, configuration 303 provides core application functionality for software applications that are executed on a mobile device. In an embodiment, configuration 303 is a CLDC. A CLDC is a set of one or more basic APIs for resource-constrained devices, such as mobile devices, and includes virtual machine features. When combined with an MIDP, a CLDC can provide core functionality, in the form of a standard runtime environment and one or more APIs, for applications that are executed on a mobile device.

In an alternate embodiment, configuration 303 is a CDC. A CDC is a set of one or more basic APIs for resource-constrained devices, such as mobile devices, and includes a virtual machine. In general, a CDC includes more basic APIs, and thus, more functionality, than a CLDC. When combined with a PDP, a CDC can provide core functionality, in the form of a standard runtime environment and one or more APIs, for applications that are executed on a mobile device.

Native OS 304 is an underlying operating system of a mobile device. In an embodiment of the invention, native OS 304 is similar to operating system 16 of FIGS. 1 and 2.

On-device database service 310, as previously described, is a software process that can be initiated, and, upon initiation, can be executed in a background of a mobile device. On-device database service 310 includes database service 311 and native OS 304. Database service 311 is a service, or daemon, that can be executed in a background of the mobile device, and can communicate with Java ME application 300 and embedded database 320. Database service 311 can process commands that are transmitted by Java ME application 300, execute corresponding commands accordingly, and transmit results of the commands back to Java ME application 300. As previously described, native OS 304 is an underlying operating system of a mobile device.

Embedded database 320, as previously described, is a database configured to link directly with a software process that connects to embedded database 320, such as database service 311. According to an embodiment, embedded database 320 includes a database library and one or more database files. The database library is configured to perform database operations. The database library is also configured to perform low-level operations, such as locking, transaction logging, shared buffer management, memory management, and similar operations. Each database file of the one or more database files is configured to store data of embedded database 320 in an integrated collection of logically-related records. Each database file of the one or more database files can be accessed by the database library of embedded database 320. In one embodiment, embedded database 320 is a Berkeley DB database.

During operation, Java ME application 300 may be required to perform a data operation on embedded database 320. Such a database operation can include selecting one or more data records, inserting one or more data records, updating one or more data records, and deleting one or more data records. According to the embodiment, when Java ME application 300 is required to perform a data operation to embedded database 320, Java ME application 300 transmits a connection request to on-device database service 310 using socket 305. A socket, as understood by one of ordinary skill in the art, is an API configured to perform inter-process communication. An inter-process communication can occur in a single device or between two or more devices over a network.

Upon receiving a connection request, on-device database service 310 accepts the connection request from Java ME application 300. In an embodiment of the invention, the acceptance of the connection request from Java ME application 300 by on-device database service 310 includes authenticating Java ME application 300. On-device database service 310 can authenticate Java ME application 300 using a well-known authentication method known to one of ordinary skill in the relevant art. Subsequently, Java ME application 300 transmits a database command to on-device database service 310 using socket 305. According to the embodiment, the database command is platform-independent. Because the database command is platform-independent, Java ME application 300 is not required to know what type of database embedded database 320 is. The database command is based on the desired data operation of Java ME application 300.

Upon receiving the database command from Java ME application 300, on-device database service 310 translates the database command into a SQL command. The SQL command is in a format that embedded database 320 can understand. Subsequently, on-device database service 310 transmits the SQL command to embedded database 320 using bridge 315. According to the embodiment, bridge 315 processes SQL commands from on-device database service 310 by converting a string of text transmitted by on-device database service 310 into a format recognized by embedded database 320.

Upon receiving the SQL command from on-device database service 310, embedded database 320 performs a database operation that corresponds to the SQL command and transmits a result of the SQL command to on-device database service 310 using bridge 315. Subsequently, on-device database service 310 transmits the result to Java ME application 300 using socket 305.

Further details of the operation are described in relation to FIG. 5.

FIG. 4 illustrates a block diagram of an application communicating with an on-device database service, where the application is located on a separate mobile device from the on-device database service, according to an embodiment of the invention. Similar to the illustrated embodiment of FIG. 3, the illustrated embodiment of FIG. 4 includes a Java ME application 300, an on-device database service 310, and an embedded database 320. According to the embodiment, Java ME application 300 resides on a first mobile device (not shown), while on-device database service 310 and embedded database 320 reside on a second mobile device (also not shown), with boundary 401 in FIG. 4 representing a boundary between the first mobile device and the second mobile device. Thus, in contrast to the illustrated embodiment in FIG. 3, Java ME application 300 and on-device database service 310 reside on different mobile devices.

Java ME application 300, on-device database service 310, and embedded database 320 of FIG. 4 are similar to Java ME application 300, on-device database service 310, and embedded database 320, except for the following differences. As previously described, Java ME application 300 and on-device database service 310 reside on different mobile devices. Thus, socket 305 is configured to facilitate communication between Java ME application 300 and on-device database service 310, where the communication occurs over a network. Furthermore, on-device database service 310 includes configuration 312 and native OS 313. Similar to configuration 303 of FIG. 3, configuration 312 includes one or more basic APIs and virtual machine features that comprise a runtime environment for a mobile application. In one embodiment, configuration 312 is a CDC. Similar to native OS 304, native OS 313 is an underlying operating system of a mobile device. However, because Java ME application 300 and on-device database service 310 reside on different mobile devices, native OS 304 and native OS 313 are different operating systems.

Figure 7:
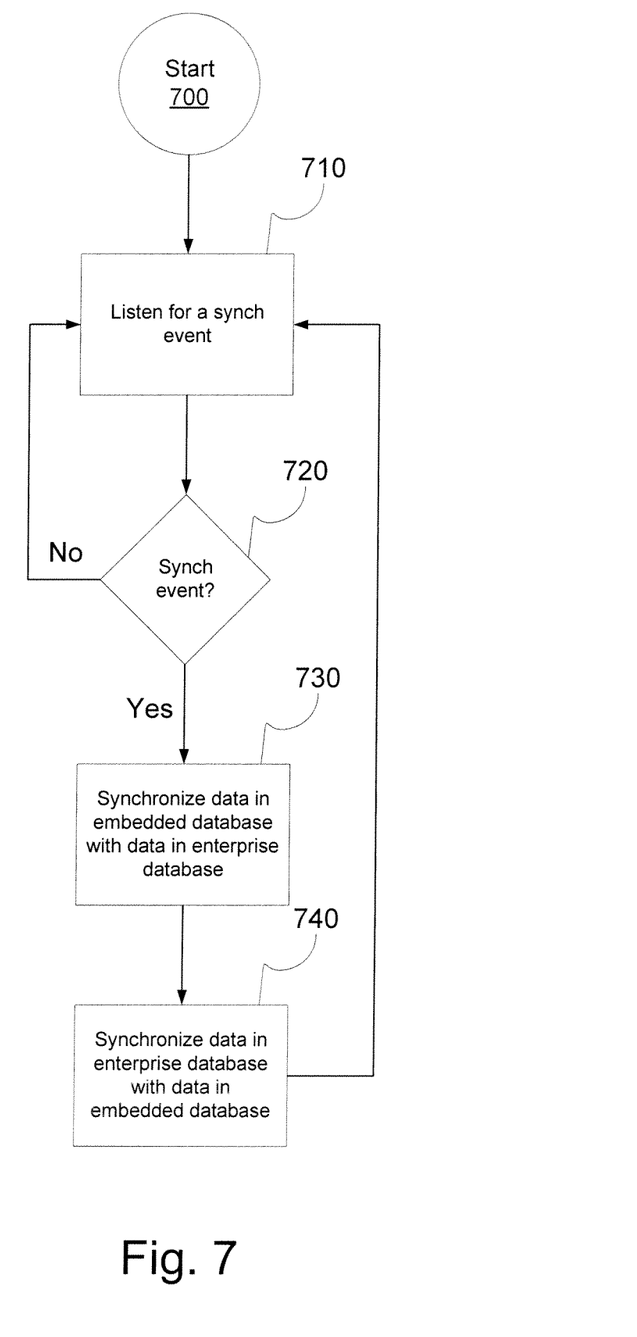
FIG. 7 illustrates a flow diagram of the functionality of a mobile sync server according to an embodiment of the invention.

FIG. 5 illustrates a flow diagram of the functionality of an on-device database service according to an embodiment of the invention. In certain embodiments of the invention, the on-device database service is similar to on-device database service 34 of FIGS. 1 and 2, and on-device database service 310 of FIGS. 3 and 4. In one embodiment, the functionality of the flow diagram of FIG. 5, and the functionality of the flow diagram of FIG. 7, is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software.

At 500, the on-device database service is initiated, and the flow begins. At 510, the on-device database service listens for a connection request to the on-device database service from an application using a socket. According to an embodiment, the on-device database service is a service that is executed in a background of a mobile device. In certain embodiments, the application is a Java ME application. In one embodiment, the Java ME application includes a main application. In another embodiment, the Java ME application includes a MIDlet. In another embodiment, the Java ME application includes an Xlet.

At 520, the on-device database service determines whether a connection request has been received from an application. If the on-device database service has not received a connection request, the flow returns to 510, and the on-device database service continues to listen for a connection request. If the on-device database service has received a connection request, the flow proceeds to 530.

At 530, the on-device database service accepts the connection request from the application using the socket. In one embodiment, the application is executed on a same mobile device that the on-device database service is executed on. In another embodiment, the application is executed on a second mobile device that is different from the mobile device that the on-device database service is executed on.

According to one embodiment, accepting the connection request from the application includes authenticating the application. The on-device database service can authenticate the application using any authentication method known to one of ordinary skill in the relevant art. By authenticating the application, the on-device database service can determine that the application is allowed to perform a database operation on an embedded database, and can prevent a rogue application from gaining unauthorized access to the embedded database.

According to an embodiment, an embedded database is a database configured to link directly with a software process that connects to the embedded database, such as the on-device database service. According to an embodiment, the embedded database includes a database library and one or more database files. The database library is configured to perform database operations. The database library is also configured to perform low-level operations, such as locking, transaction logging, shared buffer management, memory management, and similar operations. Each database file of the one or more database files is configured to store data of the embedded database in an integrated collection of logically-related records. Each database file of the one or more database files can be accessed by the database library of the embedded database. In one embodiment, the embedded database is a Berkeley DB database.

At 540, the on-device database service receives a database command from the application using the socket. The database command is based on a database operation that the application desires to perform on the embedded database. According to an embodiment, the database command is platform-independent. Because the database command is platform-independent, the application is not required to know what type of database the embedded database is.

At 550, the on-device database service translates the database command into a SQL command. The SQL command is in a format that the embedded database can understand.

At 560, the on-device database service transmits the SQL command to the embedded database. According to an embodiment, the on-device database service transmits the SQL command to the embedded database using a bridge. In accordance with the embodiment, the bridge processes SQL commands from the on-device database service by converting a string of text transmitted by the on-device database service into a format recognized by the embedded database.

At 570, after the embedded database performs a database operation that corresponds to the SQL command, the on-device database service receives a result of the SQL command transmitted by the embedded database. According to an embodiment, the on-device database service receives a result of the SQL command transmitted by the embedded database using the bridge.

At 580, the on-device database service transmits the request to the application using the socket. Subsequently, the flow returns to 510, and the on-device database service listens for a new connection request.

Certain embedded databases are concurrent embedded databases that can process two or more structured query language commands currently. An example of a concurrent embedded database is a Berkeley DB database. In an embodiment where an embedded database is a concurrent embedded database, the on-device database service can process two or more connection requests concurrently, and thus, the on-device database service can process two or more database commands concurrently. As defined in this specification, when two or more operations (such as connections requests or database commands) are performed concurrently, at least one portion of an operation overlaps with at least one portion of the other operation (or operations), so that one operation does not block the other operation (or operations) from completing.

According to the embodiment, while the on-device database service performs the functionality illustrated in FIG. 5, the on-device database service can accept a second connection request to the on-device database service from a second application using the socket. The on-device database service can receive a second database command from the second application using the socket. Upon receiving the second database command, the on-device database service can translate the second database command into a second SQL command, and transmit the second SQL command to the Berkeley DB database using the bridge. After the Berkeley DB database performs a database operation based on the second SQL command, the on-device database service receives a second result of the second SQL command transmitted by the Berkley DB database using the bridge, and transmits the second result to the second application using the socket. According to the embodiment, the transmitting of the SQL command and the result, and the transmitting of the second SQL command and the second result, are performed concurrently using a database library of the Berkley DB database. More specifically, the Berkley DB database includes a database library which provides one or more interfaces for supporting deadlock-free, multiple-reader/single, and for supporting multiple writer access to the database without violating the integrity of the data in the database.

By performing the transmitting of the SQL command and the result, and the transmitting of the second SQL command and the second result, concurrently, the on-device database service coordinates the database operations performed by the Berkeley DB database, so that the database operations can be performed concurrently. In alternate embodiments, the on-device database service can accept any number of connection requests from any number of applications, and thus, can perform the transmitting of any number of SQL commands, as well as the transmitting of any number of results, concurrently.

Figure 6:
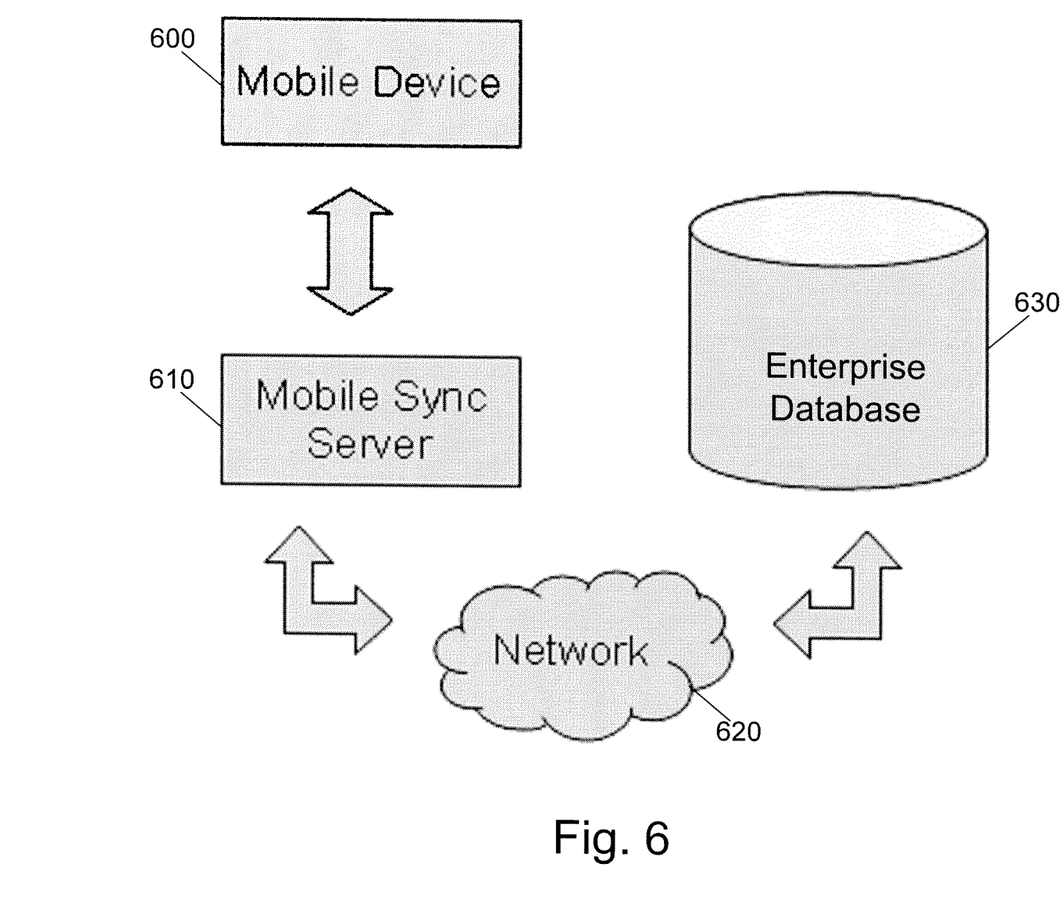
FIG. 6 illustrates a block diagram of a mobile sync server synchronizing an embedded database on a mobile device with an enterprise database on a centralized server of a network, according to an embodiment of the invention.

FIGS. 6-7 each describe a synchronization of an embedded database and an enterprise database, performed by a mobile sync server, in greater detail in accordance with embodiments.

FIG. 6 illustrates a block diagram of a mobile sync server synchronizing an embedded database on a mobile device with an enterprise database on a centralized server of a network, according to an embodiment of the invention. The illustrated embodiment includes a mobile device 600, a mobile sync server 610, a network 620, and an enterprise database 630. According to the embodiment, mobile device 600 and mobile sync server 610 reside at a first position of network 620, and enterprise database 630 reside at a second position of network 620.

Mobile device 600 can be any type of mobile device that includes an on-device database service (not shown) and an embedded database (also not shown). According to embodiments of the invention, mobile device 600 can be a mobile computer, a mobile phone, a smartphone (such as an iPhone, Blackberry, and smartphone executing an Android operating system), a PDA, a calculator, a handheld game console, a portable media player, a digital still camera, a digital video camera, a pager, a personal navigation device, or another similar type of mobile device. In one embodiment of the invention, mobile device 600 is similar to mobile computing device 10 of FIG. 1. In alternate embodiments of the invention, mobile device 600 can be a gateway, a router, a hub, a digital video recorder, a set-top box, an automobile entertainment system, an automobile navigation system, a game console, a residential gateway, a refrigerator, a washing machine, a factory automation device, an assembly line device, a factory floor monitoring device, or another similar type of mobile device. In one alternate embodiment of the invention, mobile device 600 is similar to mobile communication device 11 of FIG. 2.

Mobile sync server 610 is a server that represents a middle tier between an embedded database of mobile device 600 and enterprise database 630. Mobile sync server is configured to coordinate a synchronization process that synchronizes the embedded database of mobile device 600 with the enterprise database 630, and visa-versa.

Network 620 is a network that connects mobile sync server 610 with enterprise database 630. Network 620 can be any type of network that is known to one of skill in the relevant art. For example, network 620 can be a local access network ("LAN"), a wide access network ("WAN"), a personal area network ("PAN"), a home area network ("HAN"), a campus area network ("CAN"), a metropolitan area network ("MAN"), a global area network ("GAN"), a storage area network ("SAN"), a virtual private network ("VPN"), a wireless network, a wireless LAN, a HomePNA, a power line communication network, a G.hn network, a Bluetooth network, an optical fiber network, an Ethernet network, an active networking network, a client-server network, a peer-to-peer network, a bus network, a star network, a ring network, a mesh network, a star-bus network, a tree network, a hierarchical topology network, or any other similar type of computer network.

Enterprise database 630 is an enterprise-class database that resides on an external database server (not shown). In this specification, an enterprise-class database is defined as a database configured to store a large amount of data, such as a database configured to support a large organization (i.e., an enterprise organization). Mobile sync server 610 can connect to enterprise database 630 using network 620. In an embodiment of the invention, enterprise data 630 is an Oracle database, a product of Oracle Corporation.

According to the embodiment, the on-device database service of mobile device 600 transmits a sync event to mobile sync server 610 when the on-device database service desires to synchronize the embedded database of mobile device 600 with enterprise database 630 and visa-versa. A sync event is an event notification that notifies mobile sync server 610 to begin a synchronization process. Upon receiving the sync event, the mobile sync server 610 synchronizes data in the embedded database of mobile device 600 with data in the enterprise database. Mobile sync server 610 synchronizes the data by transmitting modifications to the data in the embedded database of mobile device 600 to enterprise database 630 over network 620. Mobile sync server 610 also synchronizes data in enterprise database 630 with the data in the embedded database of mobile device 600. Mobile sync server 610 synchronizes the data by transmitting modifications to the data in enterprise database 630 to the embedded database of mobile device 600 over network 620.

According to the embodiment, mobile sync server 610 resolves any conflict, where both the embedded database of mobile device 600 and enterprise database 630 modify the same data, based on a rule stored within mobile sync server 610. The rule identifies either the embedded database of mobile device 600 or enterprise database 630 as a priority database, and indicated that in the scenario detailed above, the priority database "wins," and the modification of the priority database is persisted in both databases, while the modification of the other database is discarded. The rule can be based on a system-defined default value, or can be configured by a user or administration of mobile sync server 610.

FIG. 7 illustrates a flow diagram of the functionality of a mobile sync server according to an embodiment of the invention. At 700, the flow begins. At 710, the mobile sync server listens for a sync event from a mobile device. As previously described, a sync event is an event notification that notifies the mobile sync server to begin a synchronization process. At 720, the on-device database service determines whether a sync request has been received from a mobile device. If the mobile sync server has not received a sync event, the flow returns to 710, and the mobile sync server continues to listen for a sync event. If the mobile sync server has received a sync event, the flow proceeds to 730.

At 730, the mobile sync server synchronizes data in an embedded database of the mobile device with data in an enterprise database. The mobile sync server synchronizes the data by transmitting modifications to the data in an embedded database of the mobile device to an enterprise database over a network. More specifically, the mobile sync server determines modifications made to the embedded database since the embedded database was last synchronized with the enterprise database, and transmits the determined modifications to the enterprise database over the network, in order to synchronize the embedded database of the mobile device with the enterprise database. In an embodiment, the enterprise database is an Oracle database.

At 740, the mobile sync server synchronizes the data in the enterprise database with the data in the embedded database of the mobile device. The mobile sync server synchronizes the data by transmitting modifications to the data in the enterprise database to the embedded database of the mobile device over the network. More specifically, the mobile sync server determines modifications made to the enterprise database since the enterprise database was last synchronized with the embedded database of the mobile device, and transmits the determined modifications to the embedded database over the network, in order to synchronize the enterprise database with the embedded database of the mobile device.

Thus, according to an embodiment of the invention, an on-device database service can be executed in a background of a mobile device. The on-device database service can listen for, and accept, socket connections from applications. The applications can either reside on the same mobile device or a different mobile device. The on-device database service handles SQL commands from the applications and coordinates the database operations to an embedded database, that also resides on the mobile device. The embedded database is subsequently synched, by a mobile server, with an enterprise database that resides on a centralized server of a network.

Thus, according to an embodiment, an on-device database service provides for concurrent access to an embedded database, where multiple applications can access and update the embedded database. Furthermore, according to an embodiment, the use of the on-device database service allows for faster access to the embedded database. In addition, with the use of an on-device database service, an application does not need to include a native library for communicating with a database library of the embedded database, due to the fact that the communication with the embedded database is decoupled from the application to the on-device database service. Due to this decoupling, only the on-device database service loads a database library of the embedded database and links the database library with the on-device database service. This avoids each application loading and linking a separate copy of the database library of the embedded database service. Thus, this decoupling leads to a less memory-intensive database system. Finally, the handling of the database commands via a socket-based connection to an on-device database service allow allows for faster SQL commands to the embedded database using a compressed SQL query.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon that, when executed by a processor, cause the processor to process database commands, the processing comprising:
    listening for a connection request to an on-device database service executed on a mobile device from an application using a socket, wherein the on-device database service comprises a service that is executed in a background of the mobile device;
    accepting the connection request from the application using the socket;
    receiving a database command from the application using the socket;
    loading a database library from an embedded database, wherein the embedded database comprises the database library and one or more database files;
    linking the database library with the on-device database service;
    translating the database command into a structured query language command using the linked database library, wherein the structured query language format is in an embedded database format;
    transmitting the structured query language command to an embedded database;
    receiving a result of the structured query language command that is transmitted from the embedded database;
    transmitting the result to the application using the socket;
    wherein the on-device database service accepts a plurality of connection requests from a plurality of applications, transmits a plurality of structured query language commands to the embedded database concurrently, and transmits a plurality of results to the plurality of applications concurrently; and
    transmitting a sync event to a mobile sync server, wherein the sync event comprises an event notification that notifies the mobile sync server to begin a synchronization process, wherein the on-device database service transmits the sync event.

2. The non-transitory computer-readable medium of claim 1, wherein the mobile sync server is further configured to:
    synchronize data in the embedded database with data in an enterprise database by transmitting modifications to the data in the embedded database to the enterprise database over a network; and
    synchronize the data in the enterprise database with the data in the embedded database by transmitting modifications to the data in the enterprise database to the embedded database over the network.

3. The non-transitory computer-readable medium of claim 1, wherein the embedded database comprises a concurrent embedded database configured to process two or more structured query language commands from the on-device database service concurrently.

4. The non-transitory computer-readable medium of claim 3, the processing further comprising:
    accepting a second connection request to the on-device database service from a second application using the socket;
    receiving a second database command from the second application using the socket;
    translating the second database command into a second structured query language command;
    transmitting the second structured query language command to the concurrent embedded database;
    receiving a second result of the second structured query language command that is transmitted from the concurrent embedded database;
    transmitting the second result to the second application using the socket; and
    wherein the transmitting of the structured query language command and the result, and the transmitting of the second structured query language command and the second result, are performed concurrently using the concurrent embedded database.

5. The non-transitory computer-readable medium of claim 3, wherein the concurrent embedded database comprises a Berkeley DB database.

6. The non-transitory computer-readable medium of claim 1, wherein the accepting the connection request further comprises authenticating the application.

7. The non-transitory computer-readable medium of claim 1, wherein the application is executed on the mobile device.

8. The non-transitory computer-readable medium of claim 1, wherein the application is executed on a second mobile device.

9. The non-transitory computer-readable medium of claim 1, wherein the application comprises a Java Micro Edition application.

10. The non-transitory computer-readable medium of claim 9, wherein the Java Micro Edition application comprises a MIDlet.

11. The non-transitory computer-readable medium of claim 9, wherein the Java Micro Edition application comprises an Xlet.

12. The non-transitory computer-readable medium of claim 1, wherein the mobile device comprises a mobile computing device.

13. The non-transitory computer-readable medium of claim 1, wherein the mobile device comprises a mobile communication device.

14. A computer-implemented method for processing database commands, the method comprising:

listening for a connection request to an on-device database service executed on a mobile device from an application using a socket, wherein the on-device database service comprises a service that is executed in a background of the mobile device;

accepting the connection request from the application using the socket;

receiving a database command from the application using the socket;

loading a database library from an embedded database, wherein the embedded database comprises the database library and one or more database files;

linking the database library with the on-device database service;

translating the database command into a structured query language command using the linked database library, wherein the structured query language format is in an embedded database format;

transmitting the structured query language command to an embedded database;

receiving a result of the structured query language command that is transmitted from the embedded database;

transmitting the result to the application using the socket;

wherein the on-device database service accepts a plurality of connection requests from a plurality of applications, transmits a plurality of structured query language commands to the embedded database concurrently, and transmits a plurality of results to the plurality of applications concurrently; and transmitting a sync event to a mobile sync server, wherein the sync event comprises an event notification that notifies the mobile sync server to begin a synchronization process, wherein the on-device database service transmits the sync event.

15. The computer-implemented method of claim 14, wherein the embedded database comprises a concurrent embedded database configured to process two or more structured query language commands from the on-device database service concurrently.

16. The computer-implemented method of claim 15, further comprising:
accepting a second connection request to the on-device database service from a second application using the socket;
receiving a second database command from the second application using the socket;
translating the second database command into a second structured query language command;
transmitting the second structured query language command to the concurrent embedded database;
receiving a second result of the second structured query language command that is transmitted from the concurrent embedded database;
transmitting the second result to the second application using the socket; and
wherein the transmitting of the structured query language command and the result, and the transmitting of the second structured query language command and the second result, are performed concurrently using the concurrent embedded database.

17. A database system for a mobile device, the database system comprising:
a memory configured to store instructions for an on-device database service;
a processor configured to execute the instructions stored on the memory; and
an embedded database configured to store data;
wherein the on-device database service comprises a service that is executed in a background of the mobile device, and further configured to:
listen for a connection request to the on-device database service from an application using a socket;
accept the connection request from the application using the socket;
receive a database command from the application using the socket;
load a database library from an embedded database, wherein the embedded database comprises the database library and one or more database files;
link the database library with the on-device database service;
translate the database command into a structured query language command using the linked database library, wherein the structured query language format is in an embedded database format;
transmit the structured query language command to an embedded database;
receive a result of the structured query language command that is transmitted from the embedded database;
transmit the result to the application using the socket;
wherein the on-device database service accepts a plurality of connection requests from a plurality of applications, transmits a plurality of structured query language commands to the embedded database concurrently, and transmits a plurality of results to the plurality of applications concurrently; and
transmit a sync event to a mobile sync server, wherein the sync event comprises an event notification that notifies the mobile sync server to begin a synchronization process, wherein the on-device database service transmits the sync event.

18. The database system of claim 17, wherein the embedded database comprises a concurrent embedded database configured to process two or more structured query language commands from the on-device database service concurrently.

19. The database system of claim 18, wherein the on-device database service is further configured to:
accept a second connection request to the on-device database service from a second application using the socket;
receive a second database command from the second application using the socket;
translate the second database command into a second structured query language command;
transmit the second structured query language command to the concurrent embedded database;
receive a second result of the second structured query language command that is transmitted from the concurrent embedded database;
transmit the second result to the second application using the socket; and
wherein the on-device database service is further configured to transmit the structured query language command and the result, and transmit the second structured query language command and the second result, concurrently using the concurrent embedded database.

* * * * *

UNITED STATES PATENT AND TRADEMARK OFFICE
CERTIFICATE OF CORRECTION

PATENT NO.         : 8,478,772 B2                                    Page 1 of 1
APPLICATION NO.    : 12/909056
DATED              : July 2, 2013
INVENTOR(S)        : Wong It is certified that error appears in the above-identified patent and that said Letters Patent is hereby corrected as shown below:

On title page, column 2, under Other Publications, line 9, delete "MobiiForms," and insert -- MobiForms, --, therefor.

Signed and Sealed this
Twenty-second Day of October, 2013

Teresa Stanek Rea
*Deputy Director of the United States Patent and Trademark Office*